US008844398B2

(12) United States Patent
Richardson

(10) Patent No.: US 8,844,398 B2
(45) Date of Patent: Sep. 30, 2014

(54) THREE-AXIS ROBOTIC SYSTEM WITH LINEAR BEARING SUPPORTS

(75) Inventor: Bruce Richardson, Los Gatos, CA (US)

(73) Assignee: Accel Biotech, Inc., Los Gatos, CA (US)

( * ) Notice: Subject to any disclaimer, the term of this patent is extended or adjusted under 35 U.S.C. 154(b) by 392 days.

(21) Appl. No.: 13/324,640

(22) Filed: Dec. 13, 2011

(65) Prior Publication Data
US 2012/0152050 A1    Jun. 21, 2012

Related U.S. Application Data

(60) Provisional application No. 61/424,641, filed on Dec. 18, 2010.

(51) Int. Cl.
B25J 17/00 (2006.01)
B25J 17/02 (2006.01)
B25J 18/00 (2006.01)
B25J 9/02 (2006.01)

(52) U.S. Cl.
CPC ............ B25J 9/023 (2013.01); *Y10S 901/16* (2013.01); *Y10S 901/23* (2013.01)
USPC .......... 74/490.01; 74/490.03; 901/16; 901/23

(58) Field of Classification Search
USPC ............... 74/490.01, 490.02, 490.03, 490.07, 74/89.32; 901/14, 16, 23, 24, 25, 21; 414/749.1, 749.6; 248/656, 657, 660, 248/913
See application file for complete search history.

(56) References Cited

U.S. PATENT DOCUMENTS

| 3,297,173 A | 1/1967 | Schott |
| 4,466,770 A | 8/1984 | Peroutky |
| 4,583,909 A * | 4/1986 | Yamashita et al. .......... 414/749.1 |
| 4,721,005 A * | 1/1988 | Yoshiji et al. .............. 74/490.04 |
| 5,368,425 A | 11/1994 | Mills et al. |
| 5,445,045 A * | 8/1995 | Nagai et al. ................ 74/490.09 |
| 5,476,358 A * | 12/1995 | Costa ......................... 414/749.1 |
| 5,631,573 A | 5/1997 | Ohno |
| 6,151,981 A * | 11/2000 | Costa ......................... 74/490.03 |
| 6,174,102 B1 | 1/2001 | Do et al. |
| 7,262,575 B2 | 8/2007 | Kircanski et al. |
| 2004/0202517 A1 | 10/2004 | Kowmowski |
| 2007/0170140 A1 | 7/2007 | Gaunekar et al. |
| 2008/0064543 A1 * | 3/2008 | Taguchi ............................ 474/8 |
| 2008/0096705 A1 * | 4/2008 | Chang ............................. 474/70 |
| 2009/0121089 A1 * | 5/2009 | Tokumitsu ..................... 248/49 |
| 2009/0180931 A1 | 7/2009 | Silbert et al. |

* cited by examiner

*Primary Examiner* — Troy Chambers
*Assistant Examiner* — Jake Cook
(74) *Attorney, Agent, or Firm* — Thomas Schneck

(57) ABSTRACT

A three-axis robotic system. On the first and second axes, respective linear bearings have movable carriages, and backbone-free linear bases acting as exclusive support or linear bearing supports. A first motor is mounted to the first linear bearing support and coupled to the first carriage. The second linear bearing support is attached at one end to the first carriage and may be orthogonal to the first linear bearing support. A second motor is mounted to the second linear bearing support and coupled to the second carriage. A third axis member is attached to the second carriage. The third axis member may be orthogonal to the first and second linear bearing supports. A third carriage is slidable on the third axis member. A third motor is mounted to the third axis member and coupled to the third carriage. Each respective motor and carriage may be coupled by a belt or leadscrew.

7 Claims, 3 Drawing Sheets

THREE-AXIS ROBOTIC SYSTEM WITH LINEAR BEARING SUPPORTS

CROSS-REFERENCE TO RELATED APPLICATION

This application claims priority from U.S. provisional application Ser. No. 61/424,641, filed Dec. 18, 2010.

TECHNICAL FIELD

The technical field of the present disclosure relates to material handling and robotics, more specifically to three-axis positioners, tool handlers and/or material handlers.

BACKGROUND

XYZ positioners, also known as three-axis positioners, are machines that can move and position a stage, an article or a tool in a working area or space defined by three-dimensional Cartesian coordinates. Usually, an XYZ or three-axis positioner has components oriented along three mutually perpendicular or orthogonal axes, with each axis having components that are fixed or movable with respect to that axis. Traditionally, the X and Y axes are horizontal and the Z axis is vertical. Movable components of the X axis move and position all of the Y axis components, along with all of the Z axis components, in the plus or minus X direction. Movable components of the Y axis move and position all of the Z axis components in the plus or minus Y direction. Movable components of the Z axis move and position a stage, an article or a tool in the plus or minus Z direction. Movement along the axes may be driven manually or by one or more motors, often geared down, and may be controlled manually (such as by a remote control) or automatically (such as by programmed activation).

Examples of XYZ or three-axis positioners historically or currently in use include pick and place robotic systems, robotic material handling, robotic tool positioning and/or handling, DNA and pharmaceutical assay systems etc. Further improvements in XYZ or three-axis positioners are sought.

For biotech, pharma or chemical applications, XYZ positioners have specific design requirements. The most important issues include:

throughput, reproducibility and consistency, i.e. accuracy and repeatability, cost, and benchtop footprint.

Throughput (speed within accuracy tolerances), cost (lower cost instrumentation) and desire to reduce benchtop footprint have all created for designers an object to produce XYZ/three axis positioners that have fewer parts, and are lighter. This generally will result in lower cost, simpler devices.

SUMMARY

A three-axis robotic system meeting the above objectives is herein disclosed. The system includes a three-axis positioner that has low mass and has comparatively fewer components than currently marketed systems.

In one embodiment, the three-axis robotic system includes a first axis linear bearing support. A first carriage is slidable on the first linear bearing support. A first motor is mounted at a first end of the first axis linear bearing support. The first motor is configured to drive the first carriage.

A second axis linear bearing support is attached to the first carriage. The second axis linear bearing support is attached to the first carriage solely at a first end of the second axis linear bearing support. A second carriage is slidable on the second axis linear bearing support. A second motor is mounted at the first end of the second axis linear bearing support. The second motor is configured to drive the second carriage.

A third axis member is attached to the second carriage. The third axis member is attached to the second carriage at a first end of the third axis member. A third carriage is slidable on the third axis member. A third motor is mounted to the third axis member. The third motor is configured to drive the third carriage. The first axis linear bearing support, the second axis linear bearing support and the third axis member may be mutually orthogonal.

In one embodiment, a three-axis robotic system includes a first linear bearing slide. The first linear bearing slide has a first movable carriage and a first linear base. A first motor is mounted at a first end of the first linear base. The first motor is coupled to the first movable carriage.

A second linear bearing slide has a second movable carriage and a second linear base. The second linear base may be orthogonal to the first linear base. The second linear base is mounted to the first movable carriage exclusively at a first end of the second linear base. A second motor is mounted at the first end of the second linear base. The second motor is coupled to the second movable carriage.

A third linear bearing slide has a third movable carriage and a third linear base. The third linear base is orthogonal to both the first linear base and the second linear base. The third linear base may be orthogonal to both the first linear base and the second linear base. The third linear base is mounted to the second movable carriage at a first end of the third linear base. A third motor is mounted at an opposed second end of the third linear base. The third motor is coupled to the third movable carriage.

The first linear base acts as an exclusive support for the first movable carriage and the second linear bearing slide. The second linear base acts as an exclusive support for the second mobile carriage and the third linear bearing slide.

In one embodiment, a three-axis robotic system includes a foundation base. At least a first post is mounted to the foundation base. A backbone-free first linear base is mounted atop the at least a first post. The first linear base is parallel to the foundation base. A first carriage is slidably attached to the first linear base. A first motor is attached to a first end of the first linear base. The first motor has a first drive pulley. A first idler pulley is attached to an opposed second end of the first linear base. A first belt is looped around the first drive pulley and the first idler pulley. The first belt is attached to the first movable carriage so that the first motor can move and accurately position the first movable carriage.

A backbone-free second linear base is mounted to the first movable carriage. The second linear base is mounted to the first movable carriage only at a first end of the second linear base. The second linear base is parallel to the foundation base and orthogonal to the first linear base. A second carriage is slidably attached to the second linear base. A second motor is attached to the first end of the second linear base. The second motor has a second drive pulley. A second idler pulley is attached to an opposed second end of the second linear base. A second belt is looped around the second drive pulley and the second idler pulley. The second belt is attached to the second carriage so that the second motor can move and accurately position the second carriage.

A third linear base is mounted to the second carriage. The third linear base is mounted at a first end of the third linear base, to the second carriage. The third linear base is orthogonal to both the first linear base and the second linear base. The third linear base is perpendicular to the foundation base. An opposed second end of the third linear base is further from the foundation base than the first end of the third linear base. A third carriage is slidably attached to the third linear base. A third motor is mounted at the second end of the third linear base. A leadscrew mechanism couples the third motor to the third carriage such that the third motor can move and accurately position the third carriage.

DETAILED DESCRIPTION

Figure 1:
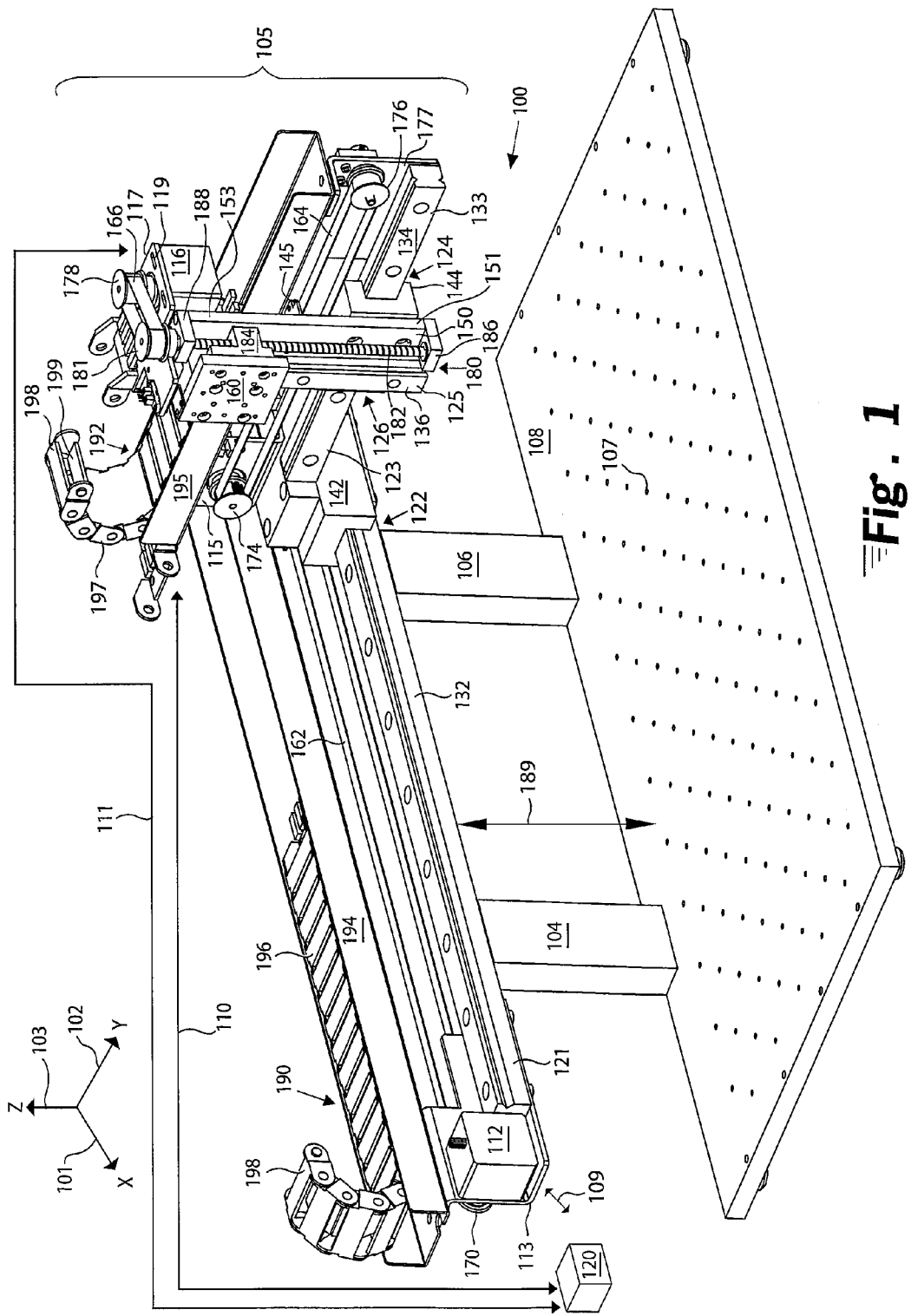
FIG. 1 is an orthogonal view of a three-axis robotic system, featuring a three-axis positioner, in accordance with the present invention.
Figure 2:
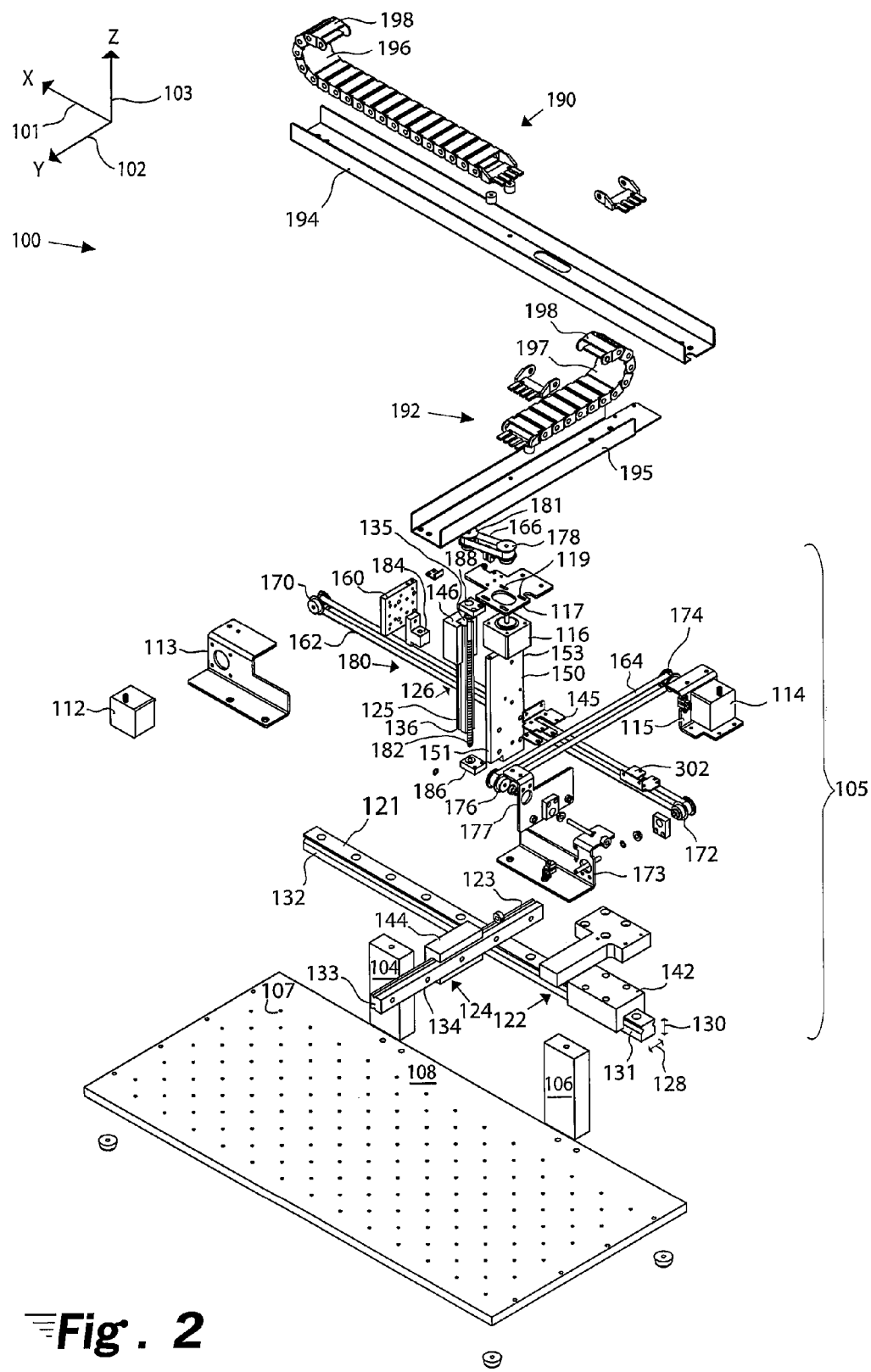
FIG. 2 is an exploded view of the three-axis robotic system of FIG. 1.

With reference to FIGS. 1 and 2, a three-axis robotic system 100, featuring a three-axis positioner 105, has a minimalist set of components that achieves decreased mass and is readily scaled larger or smaller along any or all of the three mutually orthogonal axes. The three-axis positioner 105 is mounted atop a first post 104 and a second post 106, and the posts 104, 106 are attached to a foundation base 108. Each axis has a respective motor 112, 114, 116, which can be controlled by a programmable controller 120. In various embodiments, the motors 112, 114, 116 are stepper motors, servomotors, geared motors i.e. motors equipped with respective gearboxes, fluid drive motors, air drive motors, electric AC motors, electric DC motors, brushless motors or other motors known in the art and suitable for a positioner. Linear bearings are employed for the axes.

Linear bearings are commercially available, and are also known as linear motion bearings, linear slide bearings or linear slides. A linear bearing has a stationary linear base and a moving or movable carriage. Linear bearings are available in many types, including plain bearing, dovetail slide, roller slide, and ball bearing slide. Some linear bearings have recirculating balls. The moving carriage is also known as a block, and the linear base is also known as a guide rail or a linear bearing guide, and in the case of a roller slide, a roller slide guide.

Each of the X, Y and Z axes 101, 102, 103, or first, second and third axes of the three-axis positioner 105 has a respective linear bearing 122, 124, 126. The linear bearings 122, 124, 126 are mutually orthogonal. Each linear bearing 122, 124, 126 has a respective linear base 132, 134, 136 and a respective movable carriage 142, 144, 146. Along each axis, the movable carriage 142, 144, 146 is coupled to, controlled, moved and positioned by the respective motor 112, 114, 116. Each motor 112, 114, 116 is configured to drive the respective carriage 142, 144, 146. The linear bearings 122, 124, 126 and respective linear bases 132, 134, 136 are mutually orthogonal and are oriented along or parallel to the X, Y and Z axes 101, 102, 103. Each of the movable carriages 142, 144, 146 can travel essentially completely to opposed ends of the respective linear bearings 122, 124, 126, as the linear bases 132, 134, 136 are unobstructed. In the embodiment shown, the X and Y axes 101, 102 are horizontal and the Z axis 103 is vertical, although the three-axis robotic system 100 can be repositioned and reoriented. Each of the axes, and the components and movement relating thereto, will be further discussed below.

Comparison of the disclosed three-axis robotic system 100 and included three-axis positioner 105 against standard three-axis robotic systems shows various differences. Generally, each axis of a standard three-axis robotic system employs a "backbone" that provides support for a guide track, a guide rail or other type of linear base. Examples of such backbones include beams, sheet metal housings, extruded housings, exoskeleton members, frames and other support structures to which or within which a linear base is mounted. The backbone thus provides extra strength for the linear base, preventing the linear base from flexing, bending, warping etc. Along each such axis of a standard three-axis robotic system, the backbone and the linear base provide combined support for the respective movable carriage sliding along the linear base, and thus combined support for the next backbone and the next linear base of the next axis. Some industrial systems combine two linear bases attached to a backbone for yet further increased strength along an axis. Some industrial systems combine, for one or more axes, a leadscrew and one or more round cross-section guide rails or guide tubes, with these being mounted to a backbone. In any of these standard three-axis robotic systems, differential thermal expansion of the backbone and the linear base can lead to small-scale warpage and loss of precision i.e. reduced accuracy and repeatability.

By contrast, the three-axis positioner 105 employs linear bases 132, 134 without added backbones, along with the X and Y or first and second axes. Each of these backbone-free linear bases 132, 134 provides a guide for the respective movable carriage 142, 144. Each of these backbone-free linear bases 132, 134 acts as an exclusive support for the respective carriage 142, 144 and the next linear bearing 124, 126 attached to the respective carriage 142, 144. The backbone-free linear base 132, 134, providing both a guide and an exclusive support, is thus herein termed a linear bearing support. The width 128 of the linear base 132, 134 affects the width of the guide track or guide rail presented to the movable carriage 142, 144. The thickness 130 of the linear base 132, relative to the width 128 of the linear base 132, affects the strength of the linear base as an exclusive support. In the embodiment shown, the linear bases 132, 134 are approximately as thick as they are wide. A thickness to width ratio in a range of two to one half is recommended, i.e. a thickness range from twice the width to a thickness equaling one half the width. In further embodiments, a thickness to width ratio in a range of three to one third could be used. In still further embodiments, other ranges are used.

The embodiment of the three-axis positioner 105 shown in FIGS. 1 and 2 has a type of backbone along the Z or third axis. The backbone plate 150 provides support for the leadscrew and for the third linear base 136 and the third movable carriage 146 slidably attached thereto. Further embodiments remove the backbone plate 150 along the Z or third axis and attach the third linear base 136 directly to the second movable carriage 144.

By using a backbone-free linear base 132, 134, or linear bearing support, along the X and Y or first and second axes, and in at least one embodiment along the Z or third axis, such axes are free of the small-scale warpage that can result from differential thermal expansion of a backbone and a linear base along an axis. Further, each such axis has reduced mass as the mass of the backbone has been eliminated. Reduction of mass results in quicker acceleration, improved responsiveness, reduced settling time for each axis, improved accuracy and repeatability in positioning, reduced requirements for drive power of the motors, and reduced motor sizes. Such reductions then reduce electrical power requirements for operating the system. Reducing the motor sizes further reduces the mass of the system.

As shown in FIGS. 1 and 2, along the X axis 101 or first axis, the first linear base 132 supports and guides the first movable carriage 142, which is slidably mounted to the first linear base 132. In one embodiment, the first linear bearing 122, which includes the first linear base 132 and the first movable carriage 142, is a recirculating ball bearing slide. In further embodiments, other types of linear bearings are used. The first linear base 132 is mounted atop the first and second posts 104, 106. In further embodiments, the first linear base 132 is unmounted or is mounted to other fixtures or at other heights or orientations.

The first motor 112 is mounted at a first end 121 of the first linear base 132, and has a first motor pulley 170. At a second, opposed end 131 of the first linear base 132, a first idler pulley 172 is mounted. A first belt 162, which is also known as a drive belt, is looped around the first motor pulley 170 and the first idler pulley 172, and is attached to the first movable carriage so that the first motor 112 can move and accurately position the first movable carriage 142. In the embodiment shown, the first motor pulley 170 and the first idler pulley 172 are toothed pulleys and the first belt 162 is a toothed belt, as shown in detail in FIG. 3, although other types of belts and pulleys may be used.

Figure 3:
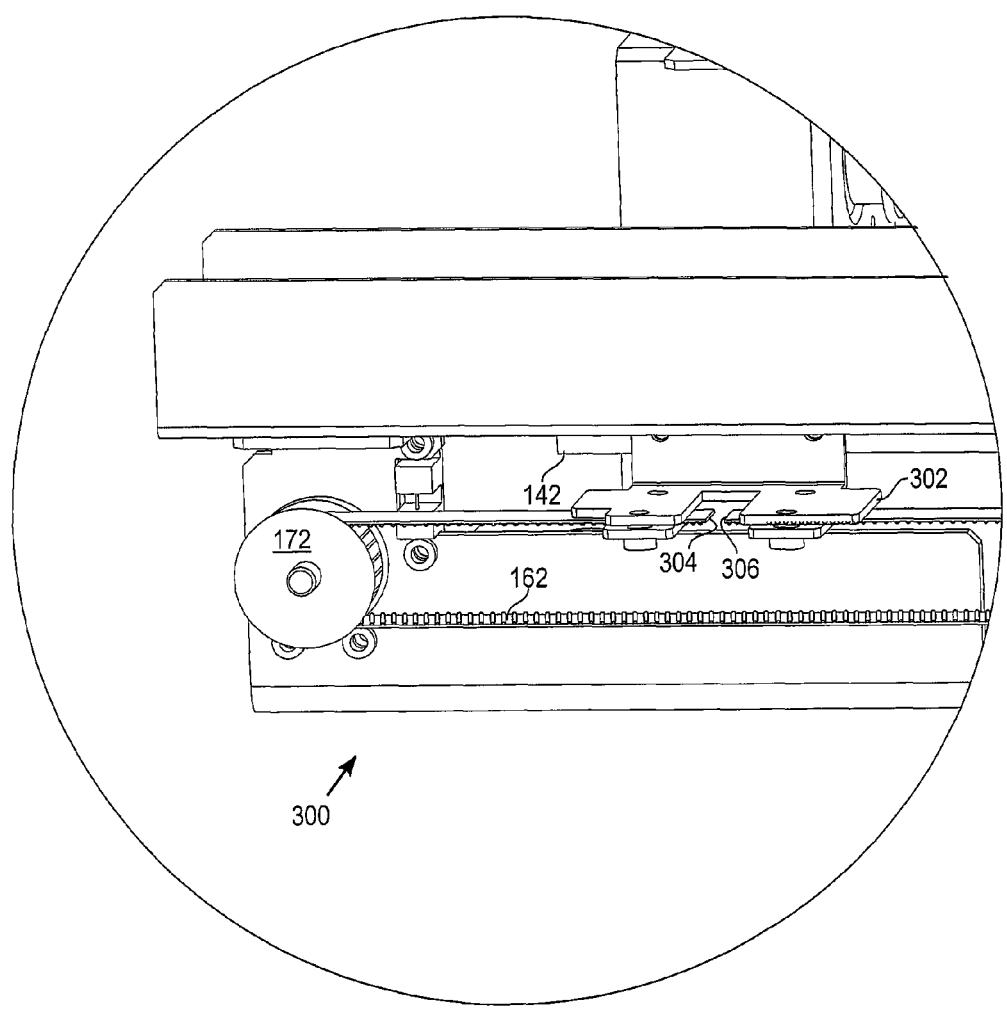
FIG. 3 is a close-up perspective view of a drive belt and carriage assembly from the three-axis robotic system of FIGS. 1 and 2.

With reference to FIG. 3, details of a drive belt and carriage assembly 300 from the three-axis positioner 105 are shown. The drive belt and carriage assembly 300 is shown coupling the first motor 112 to the first movable carriage 142, and is closely related to how the second motor 114 is coupled to the second movable carriage 144. A first belt-to-carriage bracket 302 is fastened to the first movable carriage 142, which slides along the first linear base 132. In the embodiment shown, the first belt 162 is a toothed drive belt that is cut to size from a bulk supply of belt material. Each of the cut ends of the belt, namely a first cut end 304 and a second cut end 306 of the first belt 162, is fastened to the first belt-to-carriage bracket 302, thus attaching the first belt 162 to the first movable carriage 142. In operation, the first motor pulley 170 is turned by the first motor 112, which causes the first belt 162 to move and thus the first movable carriage 142 to move along the first linear base 132. Controlling the operation of the first motor 112 controls the movement and positioning of the movable carriage 142. For example, the first motor 112 may be a stepper motor and the programmable controller 120 may include a stepper motor controller, and issue sequences of steps to the first motor 112 resulting in the movable carriage 142 moving to a planned position. As a further example, the first motor 112 may be a servo motor and the programmable controller 120 may include a servo motor controller. A continuous belt and differing methods of fastening the belt to the movable carriage 142 can be used. In further embodiments, other types of drive configurations and couplings to motors are used, or other types of belts are used e.g. ribbed, plain, grooved.

Returning to FIGS. 1 and 2, the second linear base 134 is mounted to the first movable carriage 142, solely or exclusively at a first end 123 of the second linear base 134. By this, it is meant that the first end 123 of the second linear base 134 is attached to the first movable carriage 142, and the opposed second end 133 of the second linear base 134 is a free end and is not directly attached to the first movable carriage 142 except by the attachment of the first end 123 of the second linear base 134 to the first movable carriage 142. The second linear base 134 is perpendicular to the first linear base 132, and both the first linear base 132 and the second linear base 134 are oriented horizontally and parallel to the foundation base 108.

Along the Y axis 102, or second axis, the second linear base 134 supports and guides the second movable carriage 144, which is slidably mounted to the second linear base 134. In one embodiment, the second linear bearing 124, which includes the second linear base 134 and the second movable carriage 144, is a recirculating ball bearing slide. In further embodiments, other types of linear bearings are used.

The second motor 114 is mounted at the first end 123 of the second linear base 134, and has a second motor pulley 174. At a second, opposed end 133 of the second linear base 134, a second idler pulley 176 is mounted. A second belt 164, which is also known as a drive belt, is looped around the second motor pulley 174 and the second idler pulley 176, and is attached to the second movable carriage 144 so that the second motor 114 can move and accurately position the second movable carriage 144. In the embodiment shown, the second motor pulley 174 and the second idler pulley 176 are toothed pulleys and the second belt 164 is a toothed belt, although other types of belts and pulleys may be used. Attachment of the second belt 164 to the second movable carriage 144 is accomplished with the use of a second belt-to-carriage bracket 145, in a manner similar to how the first belt 162 is attached to the first movable carriage 142 in the drive belt and carriage assembly 300 as shown in FIG. 3.

With continued reference to FIGS. 1 and 2, the third linear base 136 is mounted to the second movable carriage 144, solely or exclusively at a first end 125 of the third linear base 136. The third linear base 136 is perpendicular to both the first linear base 132 and the second linear base 134, and is oriented vertically and perpendicular to the foundation base 108.

Along the Z axis 103, or third axis, the third linear base 136 supports and guides the third movable carriage 146, which is slidably mounted to the third linear base 136. In one embodiment, the third linear bearing 126, which includes the third linear base 136 and the third movable carriage 146, is a recirculating ball bearing slide. In further embodiments, other types of linear bearings are used.

When the third linear bearing 126 is oriented vertically, as shown in FIGS. 1 and 2, gravitational forces affect the third movable carriage 146 and the ability of the third motor 116 to maintain a position of the third movable carriage 146 in the event of loss of electric power. For example, if a heavy tool or other piece of equipment were mounted to the third movable carriage 146, and if the third movable carriage 146 were driven by a belt drive mechanism such as used along the X and Y axes 101, 102 of the three-axis positioner 105, loss of electric power could result in the third motor 116 being back-driven by gravity acting on the heavy tool and the third movable carriage 146. The tool or other equipment could then move downward and contact other equipment or materials, resulting in damage. To prevent this possibility, for the Z or third axis a leadscrew mechanism 180 is used. The leadscrew mechanism 180 couples the third motor 116 to the third movable carriage 146. Although a leadscrew is preferred, in further embodiments a belt drive or other coupling to a motor can be used.

Leadscrews are commercially available, and a leadscrew is also known as a lead screw, a power screw or a translation screw. Types of leadscrews include the ballscrew or ball screw, the recirculating ball screw, and the roller screw. The main components of a leadscrew are the screw and the nut, which is also called a leadscrew nut. The recirculating ball screw has a recirculating ball nut. If the leadscrew is not of a type that has ball bearings or rollers, the screw and/or the nut may be made of low friction materials. The nut may be a split nut, which eases maintenance and replacement. Leadscrews with a shallow angle of thread pitch in the screw and nut are more resistant to back propagation of forces than leadscrews with a steep angle of thread pitch.

A backbone plate 150 is used along the Z axis 103, or third axis of the three-axis positioner 105. The backbone plate 150 provides support for the third linear base 136, the third motor 116, and the screw 182 of the leadscrew mechanism 180. The backbone plate 150 is attached to the second movable carriage 144 at a first end 151 of the backbone plate 150.

The third motor 116 is mounted at the opposed second end 135 of the third linear base 136, and has a third motor pulley 178. A transfer pulley 181 is mounted, at the opposed second end 135 of the third linear base 136, to the screw 182 of the leadscrew mechanism 180. The screw 182 rotates in a first screw bearing block 186 and a second screw bearing block 188, which are located at opposed ends of the screw 182. A leadscrew nut 184 is attached to the third movable carriage 146 and travels along the screw 182, controlled by the rotation of the screw 182. A tool-mounting plate 160 is attached to the third movable carriage 146. The first screw bearing block 186 is attached to the first end 151 of the backbone plate 150. The second screw bearing block 188 is attached to the second end 153 of the backbone plate 150. The third linear base 136 is attached to the backbone plate 150 by attaching the first end 125 of the third linear base 136 to the first screw bearing block 186 and attaching an opposed second end 135 of the third linear base 136 to the second screw bearing block. 188. The screw 182 is thus supported and located between the third linear base 136 and the backbone plate 150. The backbone plate 150 at least partially houses the lead screw mechanism 180, supports the third linear base 136, and functions as a portion of or a type of backbone for the Z or third axis. A third belt 166, which is also known as a drive belt, is looped around the third motor pulley 178 and the transfer pulley 181, so that the third motor 116 can move and accurately position the third movable carriage 146. The third motor 116 is thus coupled to the third movable carriage 146 by the third belt 166 and by the screw 182 and nut 184 of the leadscrew mechanism 180. In the embodiment shown, the third motor pulley 178, transfer pulley 181 and third belt 166 are toothed, although other types of belts and pulleys may be used. In further embodiments, a leadscrew is used for one or both of the X and Y axes 101, 102.

In embodiments with pulleys and belts, it is advantageous to be able to adjust belt tension. In the embodiment shown, each of the first, second and third motors 112, 114, 116 has a respective motor mount 113, 115, 117 with slots 119, i.e. a slotted motor mount, so that the motor can be moved fore and aft. To adjust belt tension, fasteners through the slots 119 are loosened, the motor 116 is moved until the desired belt tension is achieved, then the fasteners are re-tightened. Further, in the embodiment shown, each of the idler pulleys 172, 176 has a respective idler pulley mount 173, 177 with slots, i.e. a slotted mount, so that the idler pulley 172, 176 can be moved fore and aft. Belt tension is adjusted similarly. Further types of belt tensioning mounts are readily devised.

In embodiments with electric motors, it is advantageous to be able to route electric wires and cables safely so that the wires and cables neither entangle in the mechanisms nor interfere with workpieces and tasks. In the embodiment shown, a first cable handling unit 190 and a second cable handling unit 192 route wires along paths parallel and adjacent to the first linear base 132 and the second linear base 134, respectively. Each cable handling unit has a respective channel tray 194, 195 and a respective flexible cable routing member 196, 197. In the embodiment shown, the flexible cable routing member 196, 197 is made of a series of interconnected hollow links 198, and wires and cables are routed through the inside 199 of the flexible cable routing member 196, 197 i.e. through the hollow links 198. The first cable handling unit 190 is attached to the first linear base 132 and above the first belt 162, first motor 112 and first idler pulley 172. Wires 110, 111 or cables attaching to the second and third motors 114, 116 are routed through the first cable handling unit 190. The second cable handling unit 192 is attached to the second linear base 134 and above the second belt 164, second motor 114 and second idler pulley 176. Wires 111 or cables attaching to the third motor 116 are routed through the second cable handling unit 192. In use, as the first movable carriage 142 slides along the first linear base 132, the first flexible cable routing member 196 rolls and unrolls in the first channel tray 194, in keeping with the position of the first movable carriage 142. As the second movable carriage 144 slides along the second linear base 134, the second flexible cable routing member 197 rolls and unrolls in the second channel tray 195, in keeping with the position of the second movable carriage 144. Wires 109 to the first motor 112 do not need a flexible cable handling unit, as the first motor 112 is stationary with respect to the foundation base 108. There is sufficient space provided within the hollow links 198 in each of the first and second cable handling units 190, 192 for routing one or more hoses, for example for supplying a liquid, a gas or a vacuum.

In embodiments of the three-axis robotic system 100 that include a foundation base 108, it is advantageous to mount the three-axis positioner 105 at a height 189 above the foundation base 108 that allows full travel of a tool or other component mounted to the third movable carriage 146. Height of equipment mounted to the foundation base 108, and extension of a tool below the first end of the third linear base 136 should be considered when dimensioning the mounting of the three-axis positioner 105. Mounting the first linear base 132 at a height 189 above the foundation base 108 approximately equal to between one half and twice the length of the third linear base 136 is recommended. In the embodiment shown in FIGS. 1 and 2, the first linear base 132 is mounted above the foundation base 108 at a height 189 approximately equal to the length of the third linear base 136.

The three-axis robotic system 100 is readily scaled along one or more of the axes. Scaling the three-axis robotic system 100 along one of the horizontal axes requires essentially only replacing the first or second axis linear bearing support and the first or second belt. To lengthen or shorten along an axis, the respective linear base 132, 134, 136 is replaced with a longer or shorter linear base. The first belt 162, second belt 164 or the screw 182 of the leadscrew mechanism 180 is replaced with a similarly lengthened or shortened component. The backbone plate 150, along the Z or third axis may need to be replaced. Electrical wiring may need to be replaced. In embodiments with a cable handling unit 190, 192, the channel tray 194, 195 and flexible cable routing member 196, 197 are replaced with lengthened or shortened components. The remaining components can be used as is. Having a low parts count as compared to a standard three axis robotic system results in a lower inventory requirement, greater flexibility and reduced design and delivery cycle time for variations having longer or shorter axes.

DNA diagnostic systems, pharmaceutical assay systems and other biotech systems can make use of the three-axis robotic system 100. Sample wells, microplates, holders for mass spectrometry chips, trays of pipette tips and other fixtures used in biotechnology are readily attached to the foundation base 108, which has apertures 107 including threaded holes and dowel-pin holes in one embodiment. Tools, including special-purpose or single-function tools and general-purpose tools such as grippers, are readily attached to the third movable carriage 146 or to the tool-mounting plate 160 attached to the third movable carriage 146. One or more hoses can be routed through the cable handling units 190, 192 to such tools. In one embodiment, the controller 120 has a first, a second and a third channel communicating with the first, second and third motors 112, 114, 116 respectively, and a fourth channel that can be programmed for operation of a tool, such as a tool attached to the third carriage 146. The programmable controller 120 can be programmed for sample transfers, pipette tip exchanges, and other motions needed for rapid, automated operations of such biotech equipment. As a result of the mass reduction and elimination of warpage from competing thermal coefficients of expansion along the X and Y or first and second axes, the three-axis robotic system 100 provides a macroscopic positioning apparatus with positioning accurately repeatable to microscopic distances.

What is claimed is:

1. A three-axis robotic system comprising:
a foundation base;
at least a first post, mounted to the foundation base;
a backbone-free first linear base mounted atop the at least a first post and parallel to the foundation base;
a first carriage slidably attached to the first linear base;
a first motor attached to a first end of the first linear base and having a first drive pulley;
a first idler pulley attached to an opposed second end of the first linear base;
a first belt that is looped around the first drive pulley and the first idler pulley, and attached to the first carriage so that the first motor can move and accurately position the first carriage;
a backbone-free second linear base mounted to the first carriage only at a first end of the second linear base, parallel to the foundation base and orthogonal to the first linear base;
a second carriage slidably attached to the second linear base;
a second motor attached to the first end of the second linear base and having a second drive pulley;
a second idler pulley attached to an opposed second end of the second linear base;
a second belt that is looped around the second drive pulley and the second idler pulley, and attached to the second carriage so that the second motor can move and accurately position the second carriage;
a third linear base mounted to the second carriage at a first end of the third linear base, orthogonal to both the first linear base and the second linear base and perpendicular to the foundation base, with an opposed second end of the third linear base further from the foundation base than the first end of the third linear base;
a third carriage slidably attached to the third linear base;
a third motor mounted at the second end of the third linear base; and
a leadscrew mechanism coupling the third motor to the third carriage such that the third motor can move and accurately position the third carriage.

2. The three-axis robotic system of claim 1 wherein:
the first and second drive pulleys and the first and second idler pulleys include at least one toothed pulley; and
the first and second belts include at least one toothed belt.

3. The three-axis robotic system of claim 1 wherein:
the third motor is coupled by a third belt to a screw in the leadscrew mechanism; and
the third carriage is coupled to the screw of the leadscrew mechanism by a leadscrew nut attached to the third carriage.

4. The three-axis robotic system of claim 3 further comprising respective belt tensioning mounts for each of the first, second and third motors.

5. The three-axis robotic system of claim 1 wherein the third linear base mounted to the second carriage includes a backbone that provides added support for the third linear base and at least partially houses the leadscrew mechanism.

6. The three-axis robotic system of claim 1 wherein the at least a first post includes a first post and a second post.

7. The three-axis robotic system of claim 1 wherein the at least a first post mounts the first linear base at a height above the foundation base approximately equal to between one half and twice a length of the third linear base.

* * * * *